Jan. 3, 1950 C. H. JUDISCH 2,493,069
APPARATUS FOR MOLDING CORED ARTICLES
FROM HOT RUBBER AND THE LIKE
Filed July 2, 1946 4 Sheets-Sheet 1
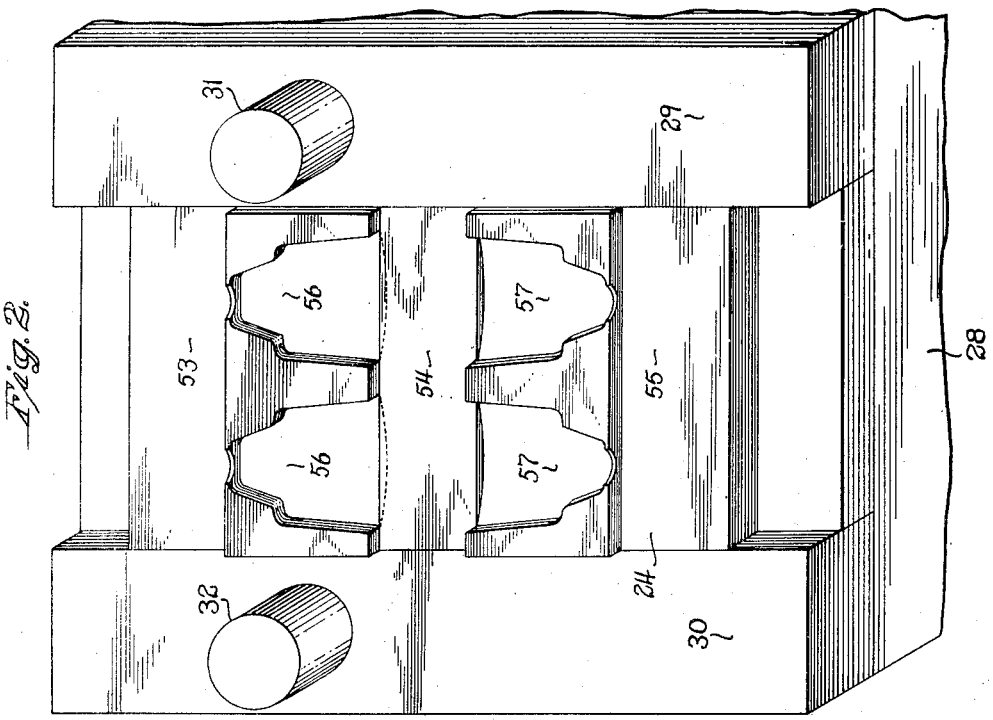
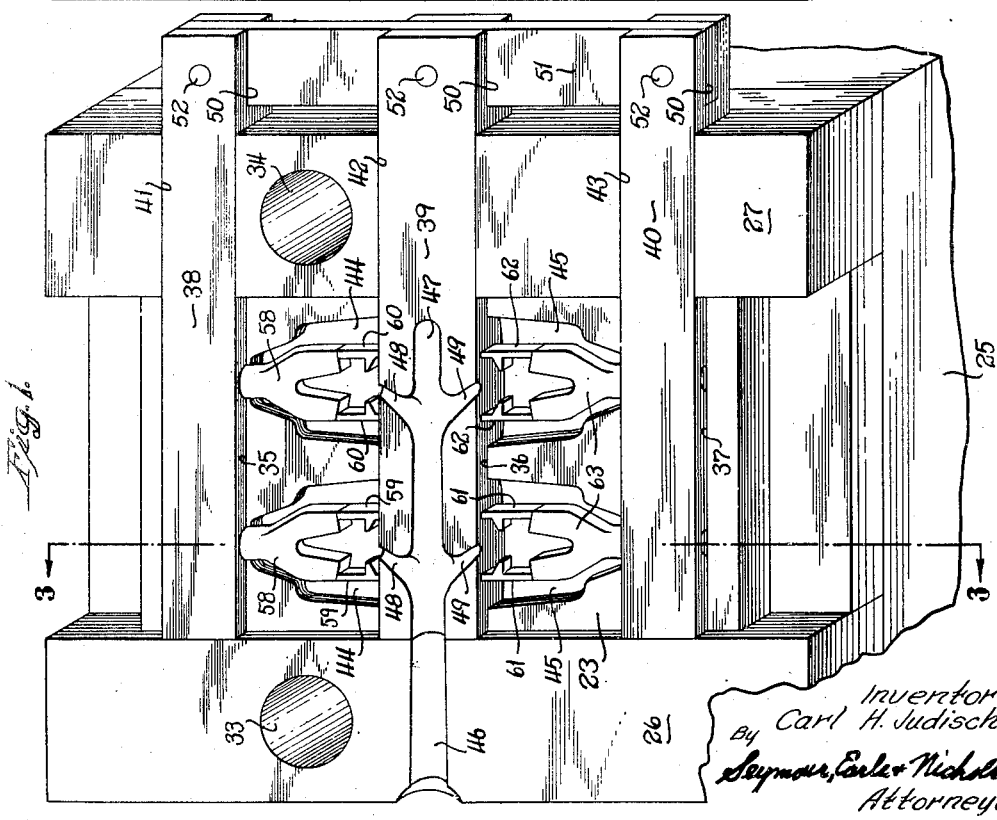
Inventor
Carl H. Judisch
By Seymour, Earle & Nichols
Attorneys

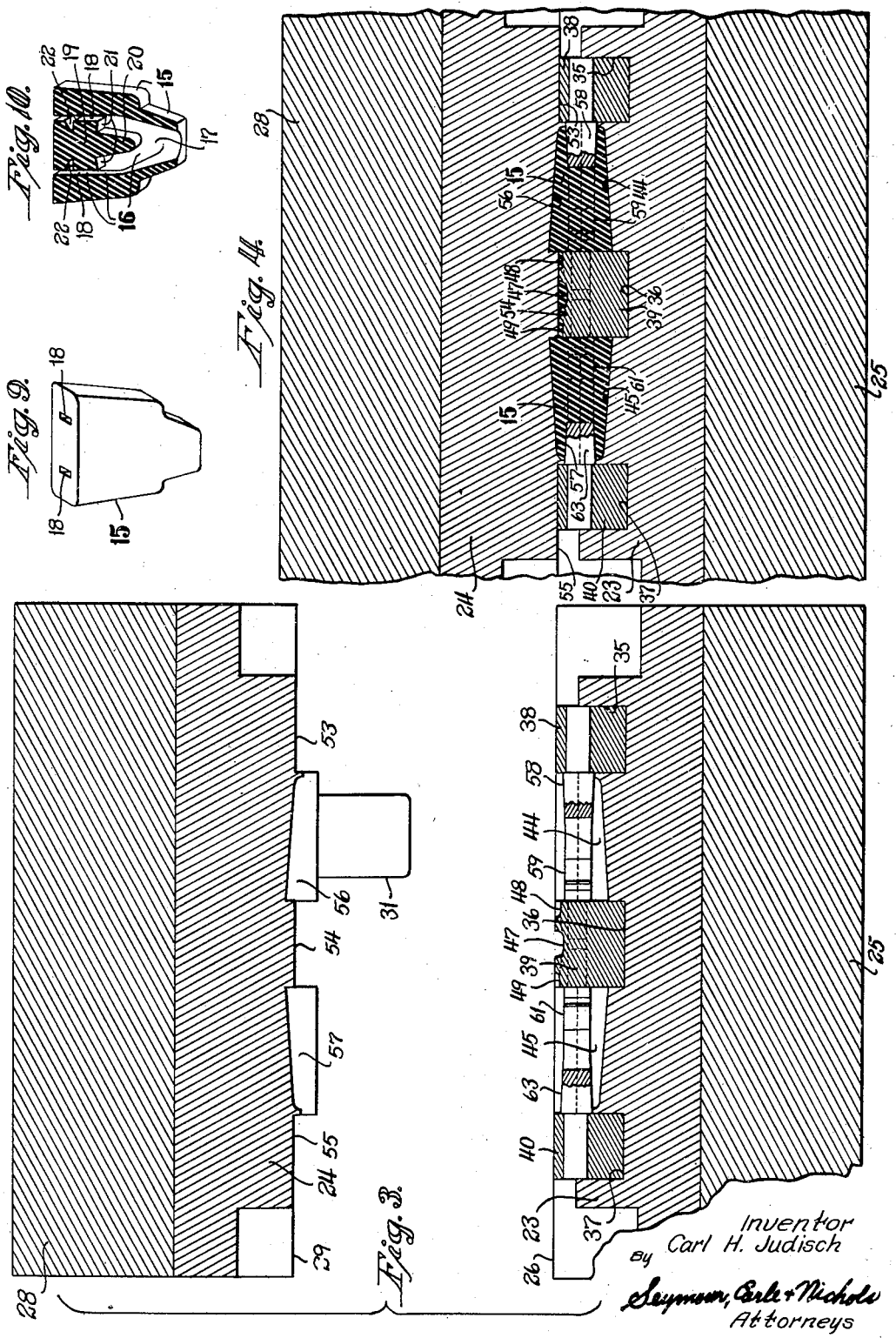

Jan. 3, 1950  C. H. JUDISCH  2,493,069
APPARATUS FOR MOLDING CORED ARTICLES
FROM HOT RUBBER AND THE LIKE
Filed July 2, 1946  4 Sheets-Sheet 3

Inventor
Carl H. Judisch
By Seymour, Earle & Nichols
Attorneys

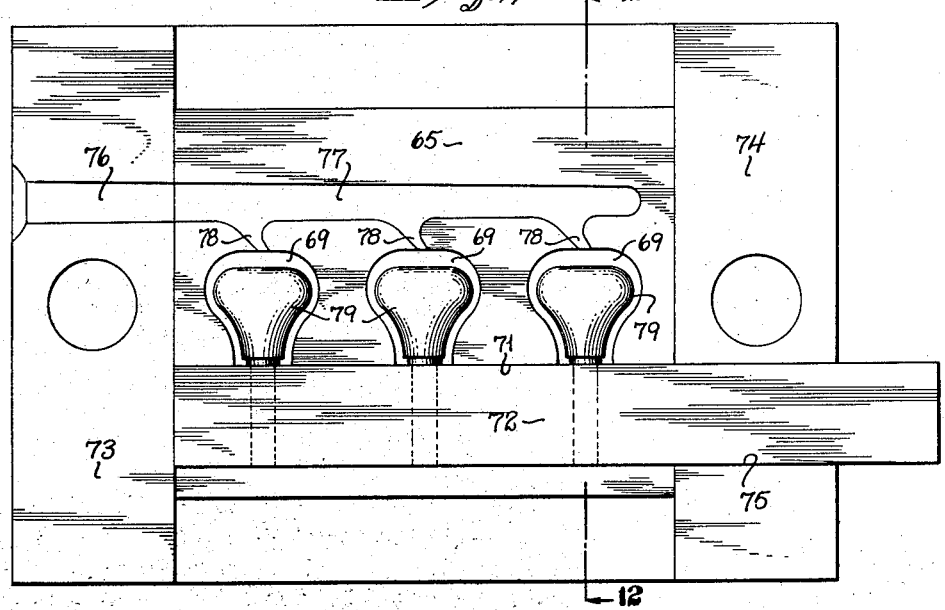
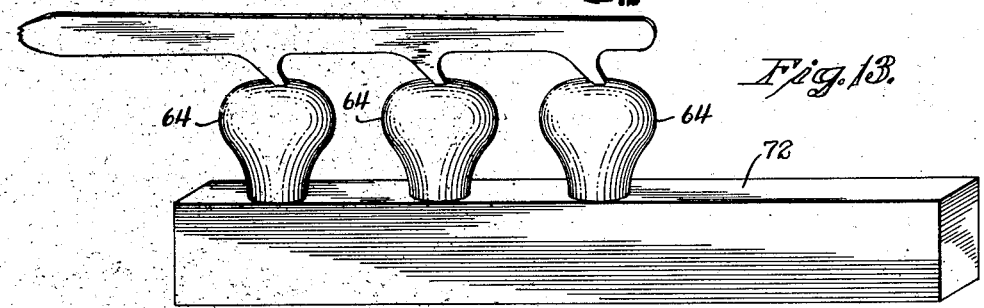
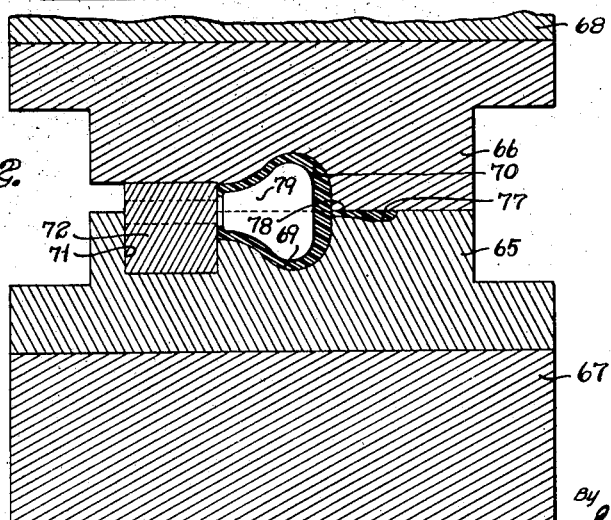

Patented Jan. 3, 1950

2,493,069

UNITED STATES PATENT OFFICE 2,493,069

APPARATUS FOR MOLDING CORED ARTICLES FROM HOT RUBBER AND THE LIKE

Carl H. Judisch, Hamden, Conn., assignor to The Whitney Blake Company, Hamden, Conn., a corporation of Connecticut Application July 2, 1946, Serial No. 680,926

8 Claims. (Cl. 18—42)

The present invention relates to improvements in apparatus for molding articles from hot rubber or other hot elastic materials. More particularly, the present invention relates to apparatus for molding articles or objects from hot rubber or other elastic materials and having cored-out interior recesses or passages of the type requiring the stretching of the material of the articles in order to separate them from the cores after the molding operation.

Attention may here be called to the fact that rubber and similar elastic materials have relatively-low resistance to tearing and distortion when hot.

Heretofore, in molding cored-out articles from hot rubber and like materials, and which articles have interior recesses or passages of such shape as to require the stretching of the material in order to permit their removal or separation from the cores, it has been the general practice to permit the molds to remain closed until the material has sufficiently cooled or set, to avoid the tearing or distortion of the material by the premature withdrawal of the cores. This procedure has required relatively-long time-intervals between successive molding operations and hence has been a major cause of high cost of production. Efforts to unduly speed-up the molding cycles has resulted in the tearing or distortion of the cored articles being molded and has increased the number of rejects, and hence the cost of production.

One of the objects of the present invention is to provide a superior apparatus for molding cored articles from hot rubber and other hot elastic materials having cored-out recesses or passages of the type referred to, whereby the time-interval between successive molding operations may be greatly reduced, with consequent lowering of costs.

Another object of the present invention is to provide a superior apparatus of the character referred to, whereby cored-out articles of rubber or similar material may be provided with recesses or passages of such character as to require the stretching of the material to effect separation of the cores and objects, and without occasioning the tearing or distortion of the said articles.

A further object is to provide a superior apparatus for molding articles of the character referred to, and such articles may be produced at low cost and with a minimum number of rejects.

With the above and other objects in view, as will appear to those skilled in the art from the present disclosure, this invention includes all features in the said disclosure which are novel over the prior art.

In the accompanying drawings, in which certain modes of carrying out the present invention are shown for illustrative purposes:

Fig. 1 is a broken perspective view of the lower mold-member and associated features of one form of molding apparatus embodying the present invention, with the core-holding bars in place and looking mainly toward the upper face of the said mold-member;

Fig. 2 is a perspective view of the complemental upper mold-member together with its mounting-plate and associated features, and looking mainly toward the under faces thereof;

Fig. 3 is a broken transverse sectional view corresponding to the position of the line 3—3 of Fig. 1, but including also the upper mold-member which is shown as separated from the lower mold-member;

Fig. 4 is a view similar to Fig. 3 but showing the two mold-members seated against each other and also showing the filling of the cavities with rubber or the like;

Fig. 9 is a perspective view of a completed plug-body;

Fig. 10 is a similar view of the completed plug-body, but showing the same in central section to expose the cavities or recesses therein;

Fig. 11 is a top or plan view of a modified form of mold-member, together with its associated core-holding bar and cores;

Fig. 12 is a transverse sectional view corresponding to the location of the line 12—12 of Fig. 11 but including also a mold-member complementing the mold-member of Fig. 11, the mold-members being closed preparatory to injection-molding a hollow object from hot rubber or other hot-injected elastic material;

Fig. 13 is a perspective view of the core-holding bar of Figs. 11 and 12 after the same has been separated from the mold-members, together with its cores and newly-molded hollow articles; and Fig. 14 is a perspective view of one of the resultant bulb-like articles.

Figure 5:
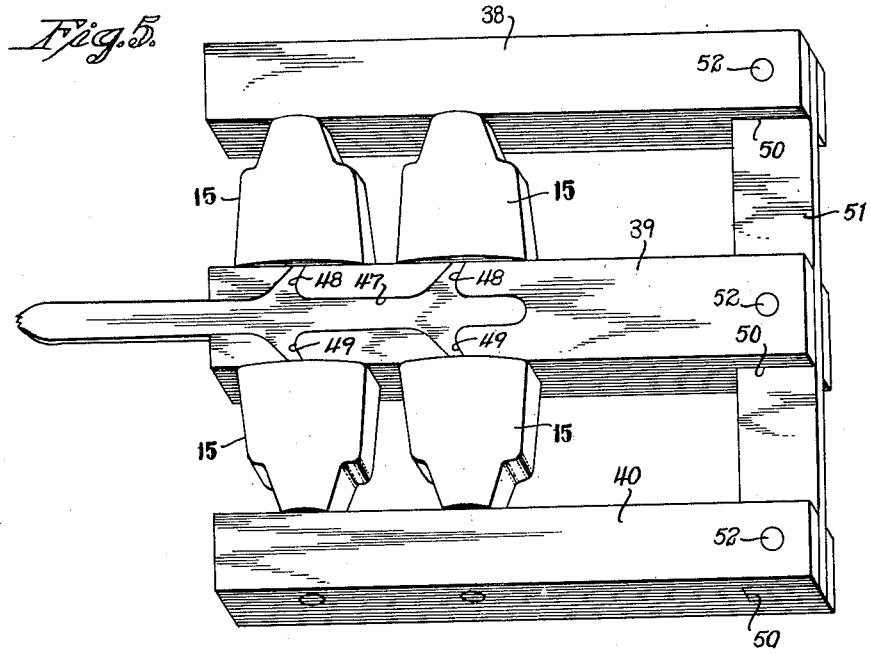
Fig. 5 is a perspective view of the unit comprising the core-bars, cores and newly-molded and still connected plug-bodies as removed from the mold-members.
Figure 6:
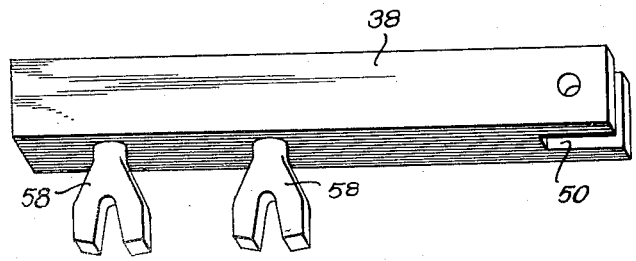
Fig. 6 is a perspective view of one of the end core-holding bars, together with its cores.
Figure 7:
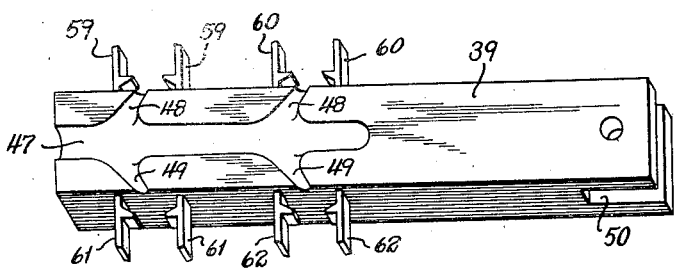
Fig. 7 is a similar view of the intermediate core-holding bar, together with its oppositely-extending cores.
Figure 8:
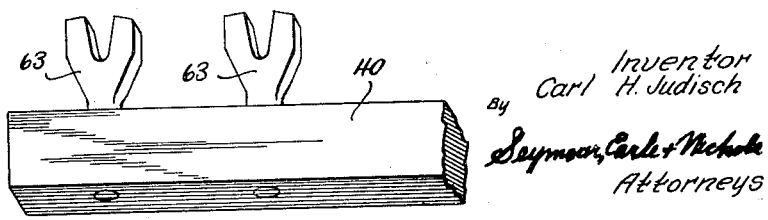
Fig. 8 is a perspective view of the remaining one of the end core-holding bars, together with its cores.

*The showing of Figs. 1 to 10 inclusive*

The apparatus illustrated in Figs. 1 to 8 inclusive for purposes of making clear a preferred form of the present invention, is specifically designed for the production of cored-out plug-bodies, generally designated by the reference character 15 and shown in completed form in Figs. 9 and 10.

The plug-body 15 or other desired article, may be molded from a wide variety of materials having the characteristics, when hot, of low tear-resistance or low distortion-resistance together with elasticity or resilience at room temperature. Among the wide variety of materials which may be employed, may be mentioned polymers of vinyl-chloride, copolymers of vinyl-chloride and vinyl-acetate, mixtures of ethyl-cellulose with polyvinyl-butyral, methyl-methacrylate, copolymers of butadiene and styrene, isoprene polymers, copolymers of isoprene and styrene, polychloroprene and various mixtures of the foregoing, including vulcanizing agents when necessary.

The plug-body 15 above referred to, is formed in its interior with a passage or cavity 16 extending therethrough from end to end and generally designated by the reference character 16. The said passage or cavity 16 may be viewed as being of substantially-Y-shaped form, as will be observed by reference to Fig. 10, inasmuch as it includes a relatively-wide arm opening through one end of the plug-body, and adjacent the other end of the said body, the said passage is divided into two substantially-parallel fingers 18—18. The fingers are separated from each other by what might be aptly termed an integral "web" 19 which has a terminal-portion 20 tapering toward the end of the plug-body in which the arm 17 of the passage or cavity 16 is formed.

On its respective opposite sides, at the location where the terminal-portion 20 integrally joins the main portion of the web 19, the said web is formed with anchoring-ledges 21—21 facing toward the arm 17 of the passage or cavity 16. Formed in the respective opposite sides of the main-portion of the web 19, in position to laterally intersect the fingers 18—18, the said web is formed with anchoring-notches 22—22.

The plug-body 15 above described, is adapted to receive a pair of wires and a pair of contact-prongs in a manner generally corresponding to that shown in Patent No. 2,169,219 dated August 15, 1939. The contact-prongs referred to, have features thereon adapted to normally engage with the anchoring-ledges 21—21 and anchoring-notches 22—22.

For the purpose of coincidentally producing in a unique manner a plurality of plug-bodies such as 15, I preferably employ an apparatus of a character shown in Figs. 1 to 8 inclusive of the accompanying drawings. The apparatus referred to includes, for convenience of description, what may be described as a "lower" mold-member 23 and a complemental "upper" mold-member 24.

The lower mold-member 23 is rigidly attached to the upper face of a lower mounting-plate 25 and is flanked at its left and right ends respectively by end-blocks 26 and 27 also rigidly secured to the upper face of the mounting-plate 25, as is especially well shown in Fig. 1.

The upper mold-member 24 is rigidly secured in any suitable manner to the under face of an upper mounting-plate 28 and is flanked at its left and right ends respectively by end-blocks 29 and 30, as is especially well shown in Fig. 2.

Extending downwardly respectively from the end-blocks 29 and 30 of the upper mold-member 24 are pilot-pins 31 and 32. The said pilot-pins 31 and 32 are respectively adapted to enter sockets 33 and 34 respectively formed in the end-blocks 26 and 27 of the lower mold-member 23. The pilot-pins 31 and 32 and their complemental sockets 33 and 34 are designed to insure the correct registry of the lower and upper mold-members 23 and 24 when the same are brought into engagement, in the manner illustrated in Fig. 4.

The lower and upper mounting-plates 25 and 28 may be mounted in any suitable injection-molding or transfer-molding press, in such manner that either or both of the said mold-members 23 and 24 may be moved toward and away from each other between the positions respectively indicated in Figs. 3 and 4, in a manner well understood in the art. While the mold-members 23 and 24 have respectively been referred to as "lower" and "upper" for the reason that this is a common arrangement, it is to be understood that the said mold-members may be arranged to move toward and away from each other in a horizontal direction or any other desired direction.

The lower mold-member 23 is formed with three holder-receiving grooves or recesses 35, 36 and 37 extending in parallelism with each other and laterally spaced apart. The said grooves or recesses are respectively adapted to receive core-holding bars or members 38, 39 and 40 in such manner that the said core-holding bars project above the upper surface of the lower mold-member 23, with their upper surfaces substantially flush with both of the end-blocks 26 and 27.

One end of each of the core-holding bars 38, 39 and 40 abuts against the inner face of the end-block 26, while the other ends of the said core-holding bars project beyond the outer face of the complemental end-block 27 in order to be readily available for removal. The said end-block 27 is formed with three grooves 41, 42 and 43 which respectively receive the adjacent portions of the core-holding bars 38, 39 and 40 and hence extend in alignment with the grooves 35, 36 and 37 in the lower mold-member 23.

Formed in the upper face of the lower mold-member 23, intermediate the holder-receiving grooves 35 and 36 therein, are two (or more) body-forming cavities 44—44 having an outline corresponding to the desired outline of the plug-body 15 and intersecting at their respective opposite ends the said holder-receiving grooves 35 and 36. Each of the cavities 44—44 just referred to, has a depth substantially corresponding to one-half of the thickness of the plug-body 15, or other cored-out article which it is desired to mold.

Also formed in the upper face of the lower mold-member 23 but at a location between the intermediate holder-receiving groove 36 and the outer holder-receiving groove 37, are two (or more) body-forming cavities 45—45 corresponding to the cavities 44—44 above described, save that they are reversed end for end, as will be apparent by reference to Fig. 1. At their respective opposite ends, the cavities 45—45 intersect the holder-receiving grooves 36 and 37 in the lower mold-member 23, for purposes as will be apparent from the following.

As above described and as shown in the drawings, the body-forming cavities 44—44 and 45—45 are respectively two in number for convenience of illustration and to avoid unnecessary duplication, though it is to be here noted that on a production basis the apparatus would preferably be such as to accommodate up to ten or more body-forming cavities in each group.

Formed in and extending transversely across the upper face of the end-block 26 of the lower mold-member 23 in line with the intermediate groove 36, is a sprue 46 through which hot and flowable rubber or the like may be introduced from any suitable source, forming a usual feature, for instance, of an injection-molding press.

The inner end of the sprue 46 above referred to intersects and registers with the adjacent end of a runner 47 extending longitudinally in the upper face of the intermediate core-holding bar 39. Also formed in the upper face of the core-holding bar is a pair of gates 48—48 leading from one edge of the said runner 47 respectively into the body-forming cavities 44—44 in the lower mold-member 23, as is shown in Fig. 1. Also formed in the upper face of the core-holding bar 39 is a pair of gates 49—49 leading out of the runner 47 respectively into the body-forming cavities 45—45 of the said mold-member 23.

For the purpose of releasably coupling the three core-holding bars 38, 39 and 40 together, each of the said core-holding bars is formed in its end which projects beyond the end-block 27, with a notch 50 receiving the adjacent portion of the edge of a coupling-bar 51. Three similar removable coupling-pins 52 respectively extend through the projecting outer ends of the core-holding bars 38, 39 and 40 and through the adjacent portions of the coupling-bar 51 to releasably couple the said elements together.

The so-called "upper" mold-member 24 is formed in its under face with three grooves or passages 53, 54 and 55 respectively adapted to receive the core-holding bars 38, 39 and 40.

Located in the under face of the upper mold-member 24 intermediate the grooves 53 and 54 therein, are two body-forming cavities 56—56 respectively adapted to register with and to complement the body-forming cavities 44—44 in the lower mold-member 23 when the two said mold-members are pressed together face-to-face preparatory to a molding operation.

Also formed in the under face of the upper mold-member 24 but in a location intermediate the grooves 54 and 55 therein, are two body-forming cavities 57—57 respectively positioned to register with and to complement the body-forming cavities 45—45 in the lower mold-member 23 when the two mold-members are brought together face-to-face, as above described.

Rigidly projecting from the core-holding bar 38 are Y-shaped cores 58—58 extending into the adjacent portions of the body-forming cavities 44—44 in the lower mold-member 23 and having a shape corresponding to the desired shape of the contracted lower portion (as viewed in Figs. 9 and 10) of the passage or recess 16 in the plug-body 15.

Complementing the cores 58—58 as above described, are two pairs of cores respectively designated by the reference characters 59—59 and 60—60. The said cores project from the edge of the intermediate core-holding bar 59 which faces toward the core-holding bar 38. Preferably and as shown, each pair of cores 59—59 and 60—60 extend into engagement, or substantial engagement, with the outer ends of the arms of the adjacent Y-shaped cores 58—58, as is indicated in Fig. 1.

A given Y-shaped core 58 and its complemental pair of cores 59—59 or 60—60 unite to provide a configuration corresponding to the desired configuration of the interior passage or cavity 16 in the core-body 15.

Rigidly carried by the intermediate core-holding bar 39 and projecting away from its other pairs of cores 59—59 and 60—60, are two pairs of cores 61—61 and 62—62 respectively extending into the adjacent ends of the body-forming cavities 45—45 in the lower mold-member 23.

Rigidly projecting from the remaining core-holding bar 40 respectively into the two body-forming cavities 45—45 are Y-shaped cores 63—63 preferably having the ends of their arms in contact, or substantial contact, with the outer ends of the complemental pairs of cores 61—61 or 62—62, as the case may be.

Now, when the mold-members 23 and 24 are brought together face-to-face under suitable holding pressure, the body-forming cavities 56—56 and 57—57 in the mold-member 24 will respectively register with and complement the body-forming cavities 44—44 and 45—45 in the mold-member 23.

The bringing-together of the two mold-members 23 and 24 in the manner just above described, will firmly hold the core-holding bars 38, 39 and 40 in place and will close the otherwise open faces of the sprue 46, runners 47 and gates 48—48 and 49—49.

Now, when flowable elastic material such as rubber, is injected under pressure into the sprue 46, it will flow into the body-forming cavities to coincidentally produce (in the particular instance illustrated) four cored-out plug-bodies such as 15.

After the injection of the elastic material, the mold-members 23 and 24 may be separated (Fig. 3) without waiting for the just-injected material to sufficiently cool or set to permit its separation from the cores. After the separation of the mold-members as just referred to, the core-holding bars 38, 39 and 40 (now connected together by the elements 51 and 52) may be jointly lifted out of their respective grooves in the mold-member 23, together with the four new-formed plug-bodies with the cores still therein, as is shown in Fig. 5.

The unit or assembly of Fig. 5 may now be set aside to cool, while a similar group of core-holding bars corresponding to the core-holding bars 38, 39 and 40, together with their respective cores and the elements 51 and 52, may be promptly installed in the holder-receiving grooves in the mold-member 23, preparatory to repeating the molding cycle with minimum delay and without the need for promptly separating the newly-formed plug-bodies 15 from the cores of bars 38, 39 and 40.

Thus, the newly-molded group of plug-bodies 15 (Fig. 5) may be promptly removed from the coactive mold-members, while the said plug-bodies are still hot and hence have low tear-resistance and low distortion-resistance.

After the newly-formed plug-bodies 15 or other cored-out articles having cores requiring the stretching of the material to effect their removal, have sufficiently cooled to withstand their being stretched to effect their separation from the cores without damaging tearing or distortion, the coupling-pins 52 may be withdrawn and the coupling-bar 51 removed from the notches 50. The various cores may be separated from the plug-bodies 15 and the latter cut free of the gates and runner. The group of core-holding bars 38, 39 and 40 may be reassembled and connected together by the coupling-bar 51 and coupling-pins 52 and reinstalled in due course in the mold-member 23 or its equivalent.

Preferably, a half dozen or more sets of core-holding bars or other suitable core-holding members like 38, 39 and 40 together with suitable coupling-bars and coupling-pins, will be provided and sequentially installed in the apparatus, while others thereof are still holding the newly-formed cored-out members.

*The showing of Figs. 11 to 14 inclusive*

In Figs. 11, 12 and 13 is illustrated an apparatus suitable for coincidentally molding a plurality of bulb-like articles 64 (Fig. 14) of elastic or resilient material having the pertinent characteristics of rubber.

The apparatus illustrated includes a lower mold-member 65 and a complemental upper mold-member 66 respectively secured to the upper and under faces of the mounting-plates 67 and 68.

The lower mold-member 65 is formed in its upper face with three (more or less) cavities 69 of a depth sufficient to form a bulb-like article such as 64 in conjunction with registering similar cavities such as 70 (Fig. 12), in the under face of the upper mold-member 66.

The contracted ends of the cavities 69 in the lower mold-member 65 intersect a holder-receiving groove 71 formed in the mold-member 65 and adapted to snugly but removably accommodate a core-holding bar 72.

The lower mold-member 65 is flanked on its respective opposite sides by end-blocks 73 and 74, as is shown in Fig. 11. The end-block 74 is formed with a clearance-groove 75 aligned with the holder-receiving groove 71 and adapted to accommodate the adjacent portion of the core-holding bar 72.

The upper face of the end-block 73 is formed with a groove-like sprue 76 which is adapted to have its outer end connected to any suitable injection apparatus. The inner end of the sprue 76 registers and communicates with the adjacent end of a runner 77 formed in the upper face of the lower mold-member 65 and extending longitudinally thereof, as is indicated in Fig. 11. The runner 77 is of sufficient length to extend adjacent the larger end of each of the three (more or less) cavities 69 and has extending laterally therefrom three gates 78, one of which serves to interconnect a given one of the cavities 69 with the runner 77.

Rigidly projecting from the core-holding bar 72 are a plurality of bulb-shaped cores 79 corresponding in number to the cavities 69 and respectively extending into the said cavities in spaced relationship to the walls thereof.

When the mold-members 65 and 66 are brought together face-to-face, as is shown in Fig. 12, hot flowable rubber or the like may be injected into the outer end of the sprue 76 for flowage through the runner 77 and thence through the gates 78 into each of the cavities 69 and 70, to thus encase the cores 79 in the manner indicated in Fig. 12.

Now without waiting for the newly-formed bulb-like articles to either thoroughly vulcanize or to cool sufficiently to permit their removal from the cores 79, the core-holding bar 72 together with its cores 79 and the newly-formed articles 64 may be removed as a unit from the apparatus (Fig. 13) and permitted to cool (where this treatment is sufficient) or to be subjected to vulcanization (where that is required), while a new unit comprising a bar like 72 together with its cores 79 is installed in the mold-member 75 and a new group of articles molded.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. An apparatus for molding cored-out articles from hot elastic material and which articles have interior recesses of the type requiring the stretching of the elastic material after molding in order to effect their separation from cores, the said apparatus including in combination: a mold-member provided with a series of molding-cavities and with two holder-receiving recesses respectively located on opposite sides of the said series of molding-cavities and laterally intersecting the same; a member cooperating with the said mold-member to close the said molding-cavities therein during the molding operation; a pair of removable and replaceable core-holding members separately formed from the said mold-member and the other said member and respectively engageable with and disengageable from the pairs of holder-receiving recesses; one of the aforesaid members being provided with a main feed-channel for the injection of hot plastic material into the said molding-cavities and with a plurality of constricted secondary feed-channels leading from the said main feed-channel respectively into the said molding-cavities; and a series of cores organized with and projecting from each of the said core-holding members and shaped to require the stretching of the molded articles to effect their separation from the said cores, the series of cores of the respective core-holding members projecting into the molding-cavities toward and into cooperating relationship with the cores of the other core-holding member; whereby after the molding operation, the said pair of core-holding members together with their respective cores and newly-molded and interconnected cored-out articles may be jointly removed as a unit from the said mold-member and set aside until the articles have sufficiently set to permit their separation from the said cores without injury.

2. The apparatus set forth in claim 1 and having connecting-means included in the combination to rigidly and removably interconnect the said pair of core-holding members and removable therewith.

3. An apparatus for molding cored-out articles from hot elastic material and which articles have interior recesses of the type requiring the stretching of the elastic material after molding in order to effect their separation from cores, the said apparatus including in combination: a first mold-member provided with a series of molding-cavities and with two holder-receiving recesses respectively located on opposite sides of the said series of molding-cavities and laterally intersecting the same; a second mold-member also provided with a series of molding-cavities respectively registering with the molding-cavities in the said second mold-member, the said second mold-member being also provided with two holder-receiving recesses respectively located on opposite sides of its said series of cavities; a pair of removable and replaceable core-holding members separately formed from the said mold-members and respectively engageable with and disengageable from the pairs of holder-receiving recesses; one of the aforesaid members being provided with a main feed-channel for the injection of hot plastic material into the said molding-cavities and with a plurality of constricted secondary feed-channels leading from the said main feed-channel respectively into the said molding-cavities; and a series of cores organized with and projecting from each of the said core-holding members and shaped to require the stretching of the molded articles to effect their separation from the said cores, the series of cores of the respective core-holding members projecting into the molding-cavities toward and into cooperating relationship with the cores of the other core-holding member; whereby after the molding operation, the said pair of core-holding members together with their respective cores and newly-molded and interconnected cored-out articles may be jointly removed as a unit from the said mold-members and set aside until the articles have sufficiently set to permit their separation from the said cores without injury.

4. The apparatus set forth in claim 3 and having connecting-means included in the combination to rigidly and removably interconnect the said pair of core-holding members and removable therewith.

5. An apparatus for molding cored-out articles from hot elastic material and which articles have interior recesses of the type requiring the stretching of the material after molding in order to effect their separation from cores, the said apparatus including in combination: a mold-member provided with two spaced-apart series of molding-cavities and also provided with an intermediate holder-receiving recess located between the two said series of molding-cavities, the said mold-member also being provided with two side holder-receiving recesses respectively positioned on the sides of the two said series of molding-cavities opposite the said intermediate holder-receiving recess; a member cooperating with the said mold-member to close the two series of molding-cavities therein during the molding operation; an intermediate removable and replaceable core-holding member formed separately from the said mold-member and the other said member and engageable with and disengageable from the said intermediate holder-receiving recess; two series of cores organized with and respectively projecting from opposite sides of the said intermediate core-holding member into the two series of molding-cavities; a pair of removable and replaceable side core-holding members formed separately from the said mold-member and the other said member and respectively engageable with and disengageable from the two side holder-receiving recesses; one of the aforesaid members being provided with a main feed-channel for the injection of hot plastic material into the said molding-cavities and with a plurality of constricted secondary feed-channels leading from the said main feed-channel respectively into the said molding-cavities; and a series of cores organized with and projecting from each of the said side core-holding members into the said molding-cavities toward and into cooperating relationship with the respective series of cores of the said intermediate core-holding member; the cores of the said series of cores being shaped to require the stretching of the molded articles to effect their separation from the said cores; whereby after the molding operation, the three said core-holding members together with their respective cores and the newly-molded and interconnected cored-out articles may be jointly removed as a unit from the said mold-member and set aside until the articles have sufficiently set to permit their separation from the said cores without injury.

6. The apparatus set forth in claim 5 and having connecting-means included in the combination to rigidly and removably interconnect the said intermediate and side core-holding members and removable therewith.

7. An apparatus for molding cored-out articles from hot elastic material and which articles have interior recesses of the type requiring the stretching of the material after molding in order to effect their separation from cores, the said apparatus including in combination: a first mold-member provided with two spaced-apart series of molding-cavities and also provided with an intermediate holder-receiving recess located between and laterally intersecting the two said series of molding-cavities, the said first mold-member also being formed with two side holder-receiving recesses respectively positioned on the sides of and laterally intersecting its two said series of molding-cavities opposite the said intermediate holder-receiving recess; a second mold-member also provided with two spaced-apart series of molding-cavities respectively registering with the two series of molding-cavities in the said first mold-member, the said second mold-member also being provided with an intermediate holder-receiving recess located between and laterally intersecting its two said series of molding-cavities, the said second-mold member being further provided with two side holder-receiving recesses respectively positioned on the sides of and laterally intersecting its two said series of molding-cavities opposite its said intermediate holder-receiving recess; an intermediate removable and replaceable core-holding member formed separately from the said mold-members and engageable with and disengageable from the said intermediate holder-receiving recesses; two series of cores organized with and respectively projecting from opposite sides of the said intermediate core-holding member into the two series of molding-cavities of each mold-member; a pair of removable and replaceable side core-holding members formed separately from the said mold-member and the other said member and respectively engageable with and disengageable from the two side holder-receiving recesses of each mold-member; one of the aforesaid members being provided with a main feed-channel for the injection of hot plastic material into the said molding-cavities and with a plurality of constricted secondary feed-channels leading from the said main feed-channel respectively into the said molding-cavities; and a series of cores organized with and projecting from each of the said side core-holding members into the said two molding cavities of each mold-member toward and into cooperating relationship with the respective series of cores of the said intermediate core-holding member; the cores of the said series of cores being shaped to require the stretching of the molded articles to effect their separation from the said cores; whereby after the molding operation, the three said core-holding members together with their respective cores and the newly-molded and interconnected cored-out articles may be jointly removed as a unit from the said mold-member and set aside until the articles have sufficiently set to permit their separation from the said cores without injury.

8. The apparatus set forth in claim 7 and having connecting-means included in the combination to rigidly and removably interconnect the said intermediate and side core-holding members and removable therewith.

CARL H. JUDISCH.

REFERENCES CITED

The following references are of record in the file of this patent:

UNITED STATES PATENTS

| Number | Name | Date |
| --- | --- | --- |
| 1,816,011 | Gurnee | July 28, 1931 |
| 1,973,117 | Sklar | Sept. 11, 1934 |
| 1,997,074 | Novotney | Apr. 9, 1935 |
| 2,200,634 | O'Koomian | May 14, 1940 |

FOREIGN PATENTS

| Number | Country | Date |
| --- | --- | --- |
| 710,375 | France | Aug. 21, 1931 |